March 24, 1970 C. F. CLEMONS 3,502,266
LOCKING DEVICE FOR A POSTAGE METER
Filed June 18, 1968 4 Sheets-Sheet 1

INVENTOR.
Cecil F. Clemons
BY
Charles R. Lepchinsky
ATTORNEY

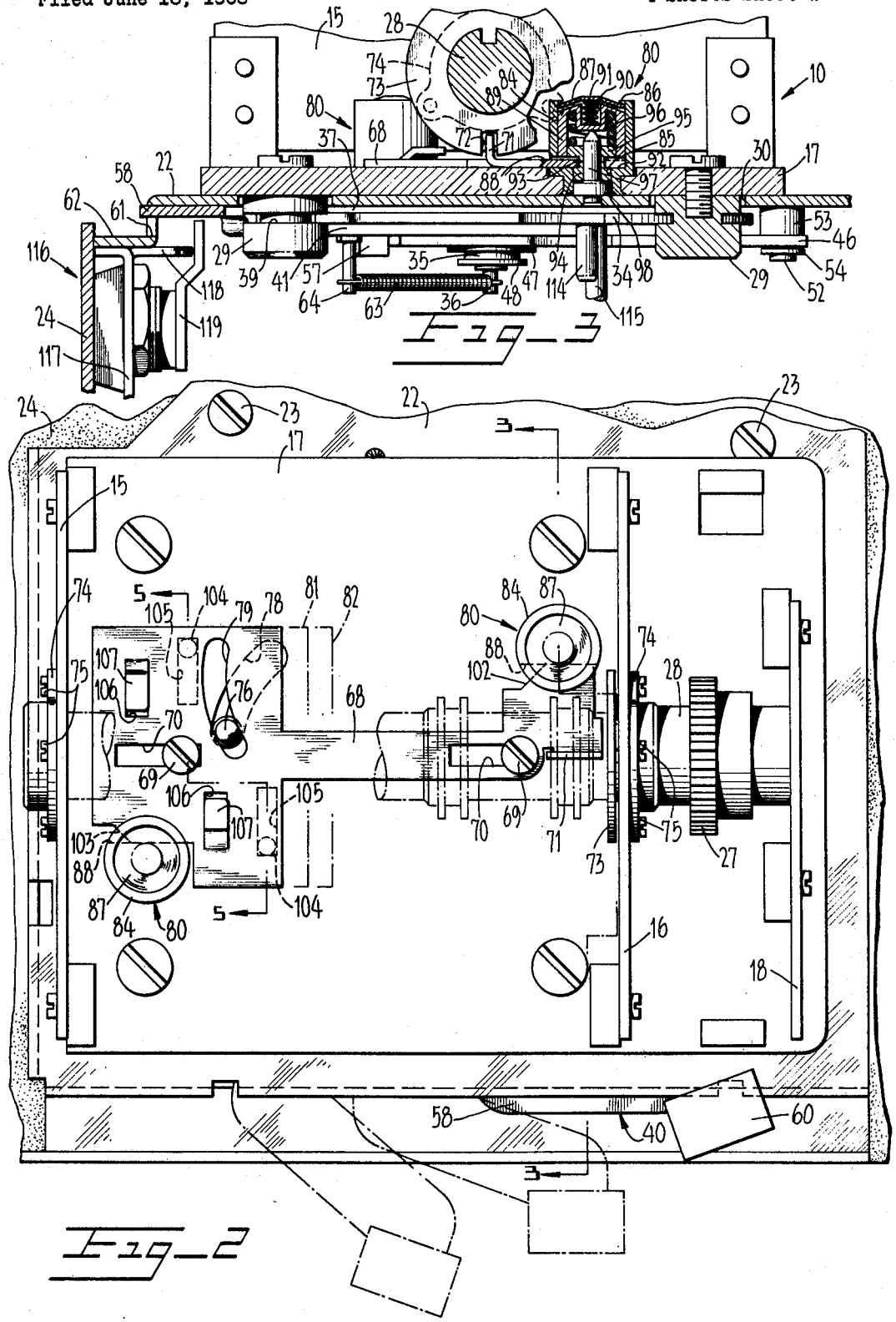

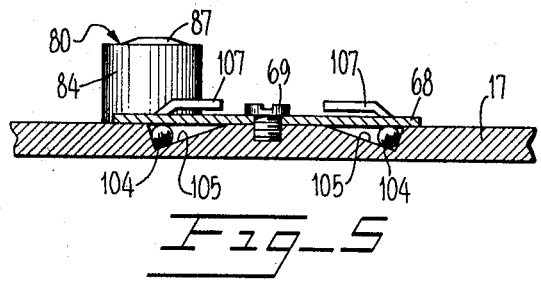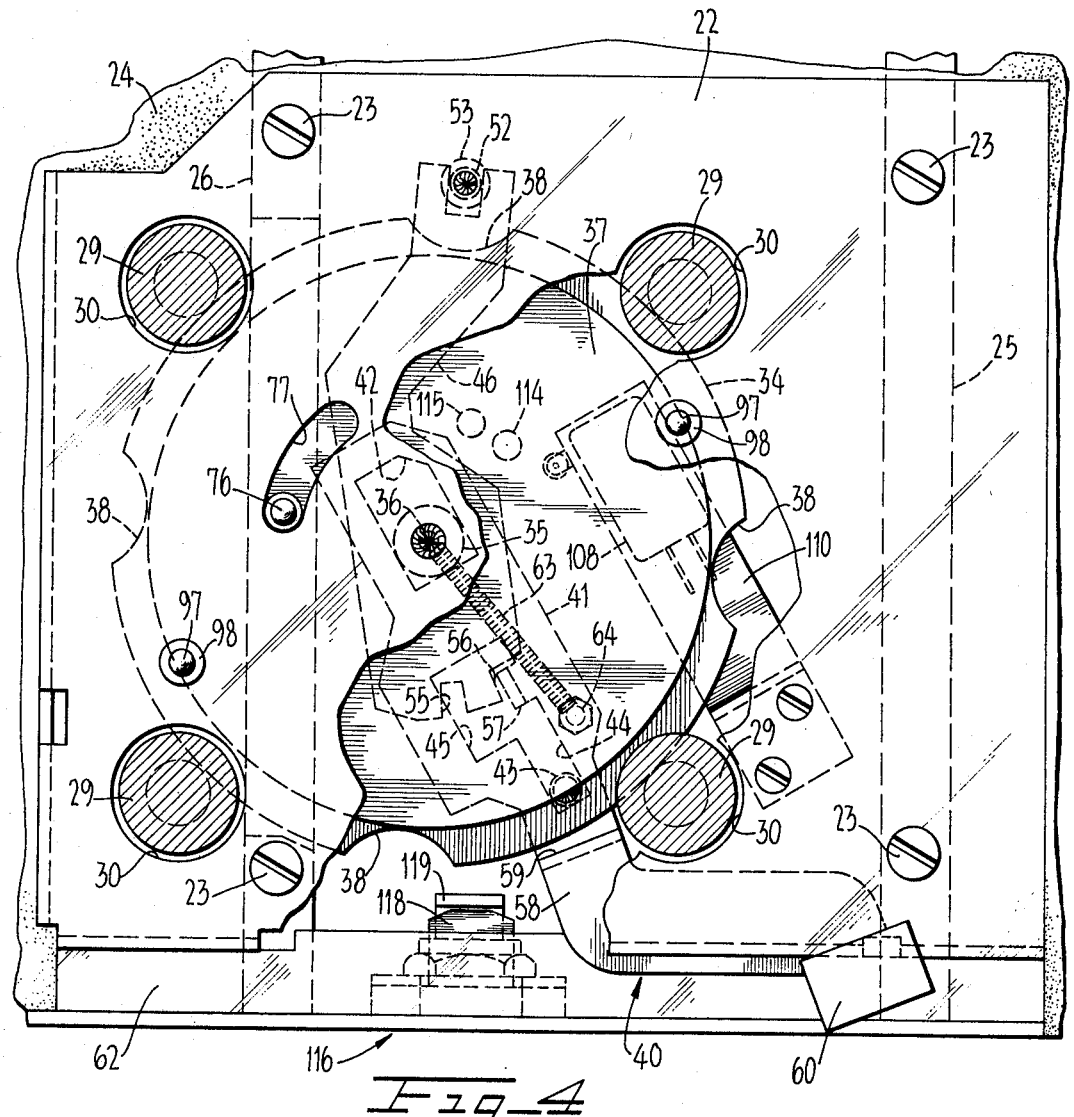

March 24, 1970  C. F. CLEMONS  3,502,266
LOCKING DEVICE FOR A POSTAGE METER
Filed June 18, 1968  4 Sheets-Sheet 4

United States Patent Office 3,502,266
Patented Mar. 24, 1970

3,502,266
LOCKING DEVICE FOR A POSTAGE METER
Cecil F. Clemons, San Leandro, Calif., assignor to The Singer Company, a corporation of Delaware
Filed June 18, 1968, Ser. No. 737,959
Int. Cl. G07g 1/00
U.S. Cl. 235—101       11 Claims

ABSTRACT OF THE DISCLOSURE

A mechanism for locking a detachable postage meter unit in operating position on a mailing machine base. The locking of the meter unit in place on the machine base is under the control of an adjustable member having three positions. In the first of such three positions of the adjustable member, the meter unit may be removed from the machine base with the print drum shaft locked and the electrical circuitry open. In the second position, the adjustable member secures the meter unit in place for envelope sealing only, with the print drum shaft locked. In order to lock the meter unit on the machine base for envelope sealing and the printing of the postage indicia, the adjustable member is moved to the third position.

BACKGROUND OF THE INVENTION

This invention relates to postage metering machines and more particularly to a multi-positionable locking device for securing a detachable postage meter unit on a supporting structure.

In the manufacture of postage meters, there are governmental requirements which make it necessary to provide numerous protective devices to prevent the fraudulent use of the meter. One such preventive measure is the enclosure of the indicia print drum in a manner such that a postage impression can only be taken by the cyclic rotation of the print drum, within a small areal opening in the cover. Other such preventive measures includes the locking and sealing of one of two registers, that is, the descending register, which is accessible only to a post office official. Also, the meter mechanism is locked to prevent any possible rotation of the print drum once the meter is removed from its supporting base.

Many of the prior art types of postage metering machines have a postage meter unit detachably supported on a machine base which includes the postage meter drive mechanism, as well as the envelope sealing mechanism, and conveyor means for moving envelopes relative to the sealing mechanism and the meter print drum. In such metering machines, the meter unit is detachable from the machine base so that it may be transported to a post office for a prepaid postage adjustment of the descending register by a post office official. Thereafter, the meter unit is replaced on the machine base and locked in the operating position by a manually controlled device. If, for any reason, the meter print drum is out of its full cycle position, the meter cannot be removed from the machine base. On the other hand, when the manual control device adjusted for removal of the meter, the print drum is locked in its full-cycle position. Prior art meter types utilizing such manually controlled devices are shown and described in Patent No. 2,522,237, of C. D. Ryan et al. and Patent No. 3,229,906, of C. S. Balaz et al., both of which patents are assigned to the assignee of the present application.

SUMMARY OF THE INVENTION

In accordance with the present invention, a multi-positionable manual control is provided for adjustment to one position to secure a postage meter unit in operating position on the base of a metering machine. In a second position of the control device, the print drum shaft of the meter unit is locked against rotation while the meter unit remains locked in position on the base, with power to the meter unit disabled, whereby the envelope feed mechanism may be utilized for a sealing operation only. As the control device is adjusted to a third position, the print drum shaft of the meter unit is locked in its full-cycle position and the meter unit is released for removal from the machine base. At this same time, the entire electrical circuitry for controlling the metering machine is disconnected. A key operated lock is also provided to selectively prevent a change in the adjustment of the manual control device from the second adjusted position.

It is, therefore, an object of the present invention to provide a postage metering machine with an improved locking mechanism.

Another object of the present invention is to provide a postage metering machine with a manually controlled locking mechanism selectively adjustable to each of a plurality of positions for enabling or disabling postage meter operation.

A further object of the present invention is to provide an improved locking mechanism for a postage metering machine to prevent fraudulent use of the postage meter.

DESCRIPTION OF THE DRAWINGS

FIG. 2 is a fragmentary plan view of the metering machine base, showing the postage meter locked in operating position thereon;

FIG. 3 is a fragmentary sectional elevational view of the postage meter secured in operating position on the machine base, the view being taken on the plane indicated by line 3—3 of FIG. 2;

FIG. 4 is a fragmentary plan view of the metering machine base with a portion of the meter supporting plate broken away to show the locking mechanism;

FIG. 5 is a fragmentary sectional elevational view of the meter base showing the tilt locks, the view being taken on the plane indicated by lines 5—5 in FIG. 2.

Figure 1:
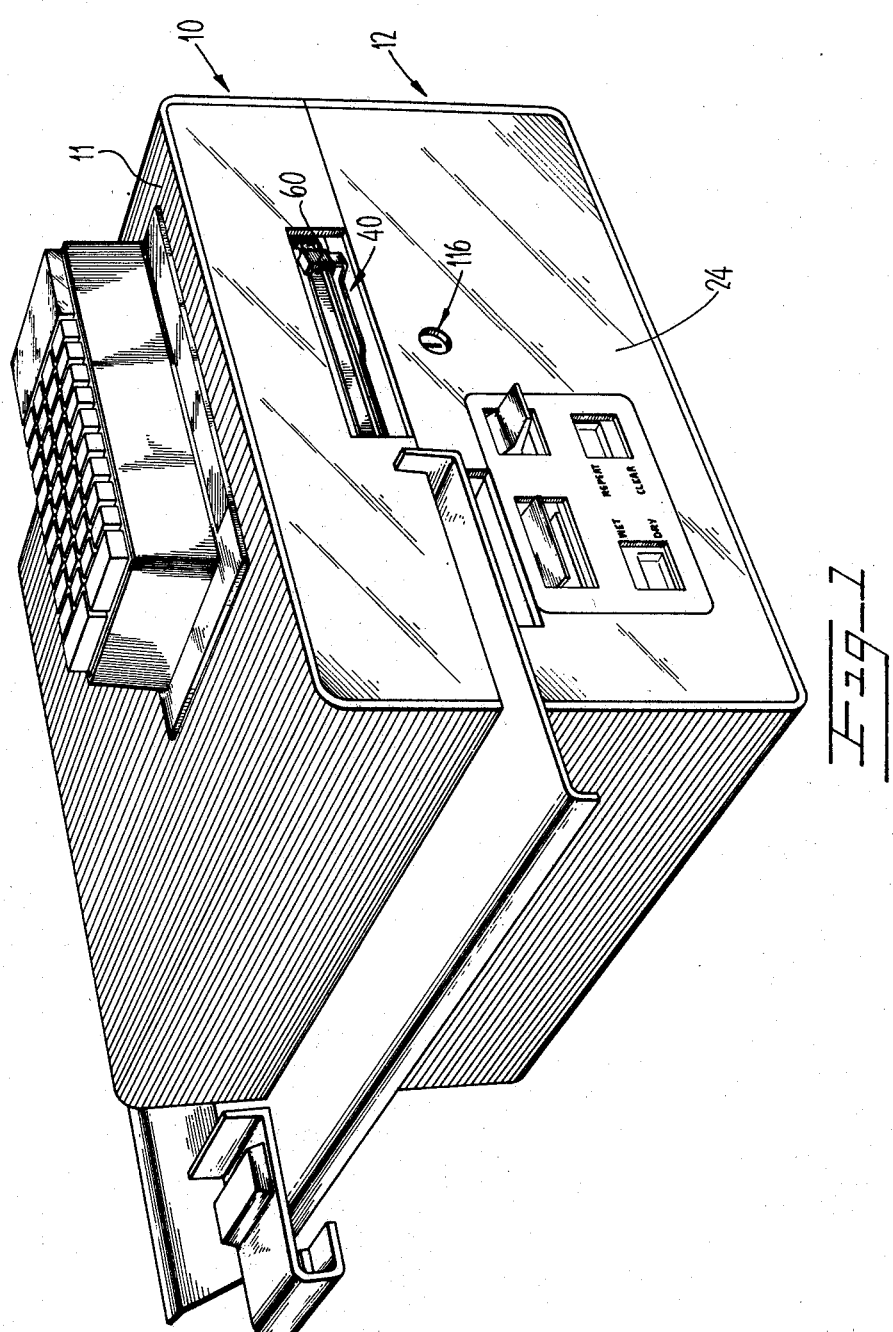
FIG. 1 is an oblique plan view of a postage metering machine.

The present invention is preferably shown as embodied in the postage metering machine of the type disclosed in the copending application of Reus et al., Ser. No. 725,006, filed Apr. 29, 1968, having a meter unit 10 (FIG. 1) enclosed within cover 11 and removably supported on base portion 12. Enclosed within the base portion 12 is the conventional power drive mechanism for the cyclic clutch-controlled meter unit 10 and the continuously driven envelope feed. In mounting the postage meter unit 10 upon the base portion 12, it is necessary that the meter unit be correctly positioned on supporting plate 22 (FIGS. 3, 4 and 6) of the base portion 12, and firmly secured thereon to establish the driving connection between the power drive mechanism and the meter. The supporting plate 22 may be secured on the base portion 12 by any suitable means such as machine screws 23, which are passed through the plate 22 and an opening in cover 24 for threaded engagement in the vertically disposed spaced parallel frame members 25 and 26 (FIG. 4).

A series of four cylindrical feet, or pads, 29 are provided for the purpose of properly positioning the meter unit 10 upon the supporting plate 22 so that the gear 27 (FIG. 2) carried by the main drive, or print drum, shaft 28 of the meter, is operatively engaged with the power drive mechanism. Print drum shaft 28 is suitably supported for rotation in end frame members 15 and 16 and auxiliary frame member 18, each of which members is secured in spaced parallel relationship to the others on meter base plate 17. Likewise, the feet 29 (FIGS. 3, 4 and 6) are secured on the bottom surface of the meter base 17 and are disposed in a quadrantal arrangement, i.e., they are equiangularly spaced about a common center. As the meter is mounted upon the meter supporting plate 22, the cylindrical feet 29 extend through corresponding apertures 30 in plate 22, the diameter of the apertures 30 being only sufficiently larger than that of the feet 29 to permit the passage of the feet therethrough.

In order to enable the removal of the meter from, or the securing of the meter on, the supporting plate 22, a locking disk 34 must be adjusted to a selective one of three angularly rotated positions. In one such position of the disk 34, the meter may be removed from the plate 22. In a second or intermediate angularly rotated position of the disk, the meter is secured in place of plate 22 with power only to the envelope feed mechanism of the metering machine. Upon adjustment of the locking disk 34 to the third position, the meter is locked in place on plate 22 and the electrical circuit is closed for power to both the envelope feed mechanism and to the postage meter.

Locking disk 34 is carried by a hub 35 rotatably supported on a pin 36, secured on the lower surface of plate 22, and is disposed for rotation in a plane parallel to the lower surface of the plate 22, spaced therefrom by an antifrictional disk, or washer, 37. In the peripheral edge of the disk 34, are four equiangularly spaced arcuate indentations 38 which, in one engularly-adjusted position of the locking disk 34, are in registry with the corresponding apertures 30 in plate 22. The radius of each arcuate indentation 38 is identical to that of the corresponding apertures 30 and, when in registry therewith, enable the removal or replacement of the meter on plate 22.

Upon placement of the meter on supporting plate 22, the feet 29 extend below the locking disk 34 so that an annular groove 39 provided in each of the feet is positioned in the rotational plane of the disk 34. The grooves 39 are adapted for engagement by the peripheral edge portion of the disk 34 upon angular adjustment thereof to either the intermediate or third meter locking position.

In order to control the selective angular adjustment of the locking disk 34, an operating handle, generally indicated at 40 (FIGS. 2, 3, 4 and 6) is provided and comprises a slide member 41. Within the inner end portion of slide 41, is a substantially rectangular opening 42 engaging the hub 35 of the disk 34. Adjacent its peripheral edge, locking disk 34 carries a pin 43 engaged in an elongated slot extension 44 of an enlarged opening 45 in a distended portion of slide 41. The hub 35 in opening 42 provides a pivotal support for slide 41 and together with pin 43 in slot 44, serve as guides for the radial movement of the slide supported between a detent bar 46 and disk 34, slide 41 being contiguous with disk 34 and detent bar 46. Intermediate its ends, detent bar 46 is freely supported on hub 35 and is retained in position thereon by any suitable means, such as a clip 47. Similarly, a clip 48 engaged in a suitable annular groove in pin 36 serves to rotatably retain locking disk 34 on pin 36 in contiguity with antifriction disk 37.

Figure 6:
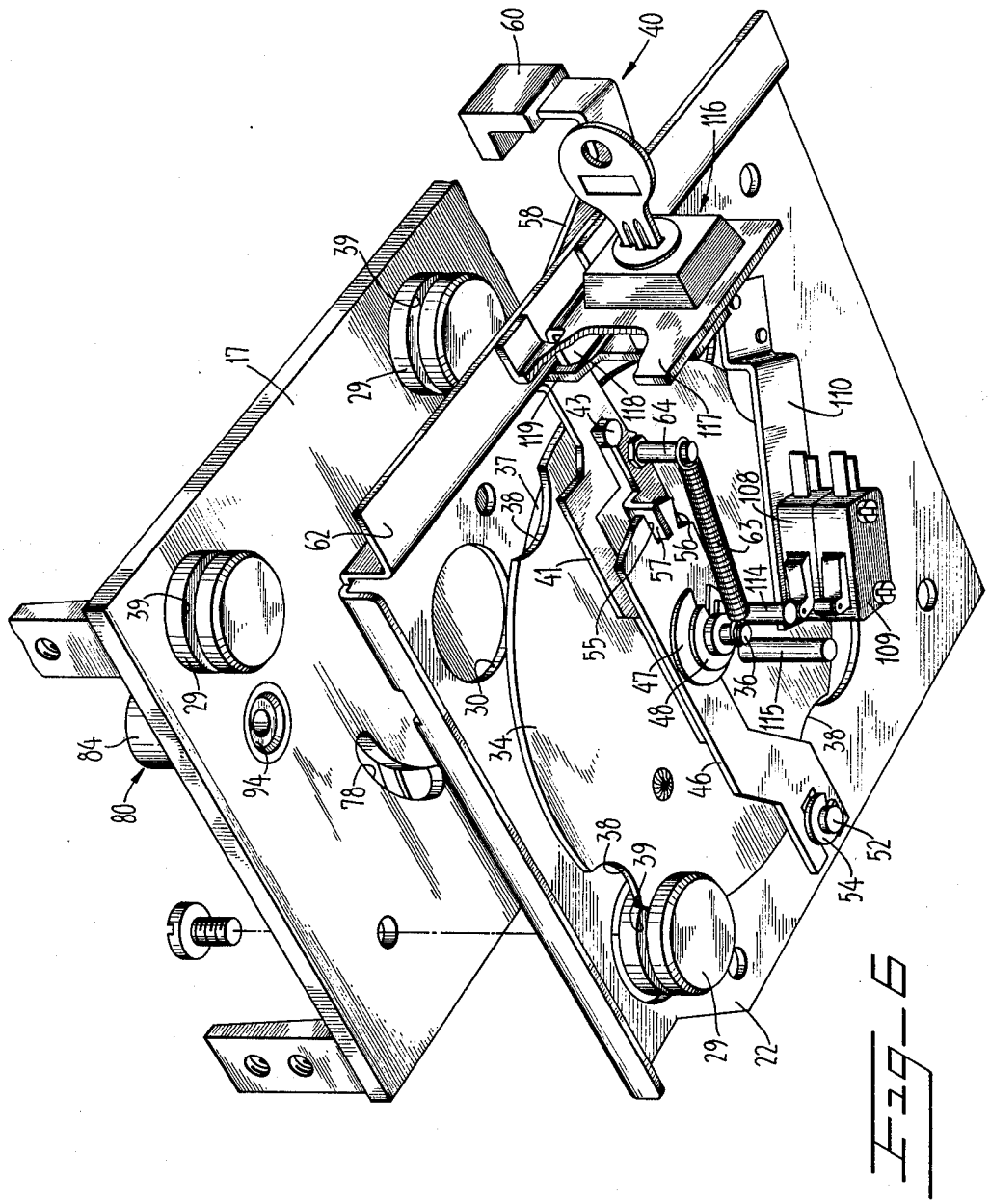
FIG. 6 is a perspective view of the bottom of the meter supporting plate showing the locking control device.

At its one end, detent bar 46 is provided with a bifurcated engaging a pin 52 secured on mounting plate 22 to prevent rotational movement of the bar (FIGS. 3, 4 and 6). Bar 46 is positioned adjacent locking disk 34 and is maintained in a plane parallel thereto on plate 22 by means of a spacer 53 on pin 52. To secure the end of detent bar 46 in place on pin 52, a clip 54 is engaged in a suitable annular groove in the pin. At its other end, the detent bar 46 is provided with two angularly disposed notches 55 and 56 for selective engagement by an ear 57 carried by slide 41 and formed downwardly at a right angle thereto. Notches 55 and 56 are representative of the intermediate and meter operating positions, respectively, of operating handle 40 and locking disk 34.

The outer angularly extended end portion 58 of slide 41 is offset upwardly at 59, beyond the edge of locking disk 34, for movement in an horizontal plane i.e., parallel to the rotational plane of disk 34. At its extremity the extended portion 58 of the slide 41 is formed upwardly and supports a suitable finger grip 60 for controlling the radial movement of the slide, as well as the angular adjustment of the locking disk 34. The extended end portion 58 is disposed for movement in a suitable, elongated slot 61 (FIG. 3) in the offset flange portion 62 of the supporting plate 22. Normally, slide 41 is resiliently biased radially inwardly by means of a spring 63, secured at its one end on pin 36 and at its other end on a pin 64 carried by slide 41.

As stated hereinbefore, upon adjustment of the manually controlled operating handle, or locking device, 40 to the inoperative or meter removal position or to the intermediate or "Seal Only" position, the print drum shaft 28 is locked in its full-cycle position. For this purpose, a full-cycle lock bar 68 (FIGS. 2 and 3) is mounted for endwise sliding movement on the inner surface of the meter unit base 17. A pair of shoulder screws 69 are threaded into the meter base 17 and are engaged in similar elongated slots 70 in lock bar 68 to guide the lock bar in its reciprocatory movement in the direction of the axes of print drum shaft 28 and parallel thereto. At its rightmost end, lock bar 68 (FIG. 2) is provided with an ear 71 formed upwardly at a right angle thereto (FIG. 3) and is disposed on a vertical center line through the axis of shaft 28. Upon movement of the lock bar 68 to the right in FIG. 2, ear 71 is adapted to enter a full-cycle radial notch 72 in a disk 73 keyed on print drum shaft 28, adjacent end frame 16. Adjacent the print drum end and the drive end, shaft 28 is journalled in similar bearings 74 secured by any suitable means such as screws 75 on respective end frames 15 and 16, and is supported at its extreme drive end in auxiliary end frame 18.

In order to control the movement of the lock bar 68, locking disk 34 carires a pin 76 projecting upwardly through an arcuate slot 77 in supporting plate 22. In the operating position of the meter on plate 22, as seen in FIG. 2, the pin 76 is of a length sufficient to extend through a similar arcuate slot 78 in meter base 17, for engagement in an arcuate slot 79 in lock bar 68. Slots 77 and 78 (FIGS. 2 and 4) are in registry, one with the other, and the pin 76 is disposed in the lower end of the slots 77, 78 and 79 (FIGS. 2 and 4) when the operating handle 40 and locking disk 34 are in the position shown and the meter is in full operating condition. As the manual control 40 is moved from the full-line position shown in FIG. 2 to the intermediate position shown in phantom line, the lock bar 68 is moved to the right sufficiently to engage the ear 71 in the notch 72 in disk 73, locking the print drum shaft 28 in its full-cycle condition. Upon movement of the manual control 40 to the leftmost or inoperative position shown in phantom line in FIG. 2, the bar 68 is moved the full extent of its movement to the right and the ear 71, while still engaged in notch 72, passes into a suitable clearance notch (not shown) in end frame 16, aligned with notch 72. Thus, print drum shaft 28 is retained in its locked condition. For each adjustment of the manual control 40 from the full-line position in FIG. 2, lock bar 68 is moved an extent indicated by the respective phantom lines 81 and 82.

With the adjustment of the manual control, or operating handle, 40 to the extreme left position, indicated in phantom line in FIG. 2, and upon removal of the meter unit from the supporting plate 22, a pair of similar secondary plunger-type locks, generally indicated at 80 (FIGS. 2 and 3), become effective to prevent retraction of lock bar 68 and the removal of the ear 71 from its locking engagement with disk 73. The locks 80 are of identical construction so that a description of one, it is believed, will suffice for both. Each of the plunger locks 80 comprises a hollow cylinder 84 secured in meter base 17. The bore 85 of the reduced diametral lower end portion of the cylinder 84 is of a depth substantially equivalent to the thickness of the meter base 17. A circular flange, or lip, 86 is formed at the top of the larger diametral portion of the cylinder 84 to retain a domed cap 87. Near the base of the larger portion of the cylinder, a chordal slot 88 is provided with the chord of the slot in the cylinder 84 disposed parallel to the axis of shaft 28 and to the direction of movement of lock bar 68, the lower surface of the slot 88 being flush with the top surface of the base 17. The height of the slot, or opening, 88 is sufficiently greater than the thickness of the bar 68 to permit its passage therethrough.

Within the chamber formed in the cylinder 84 is a piston 89 having a cup-like depression 90 formed in the top thereof to support a coil spring 91. Spring 91 is compressible between the bottom of depression 90 and the inner surface of the domed cap 87 to maintain cap 87 against lip 86 and to normally urge piston 89 downwardly against an annular shoulder 92 in the cylinder 84. Disposed for axial sliding movement within cylinder 84 is a spool 93 having the lower flange 94 thereof slidably supported within bore 85 and the other flange 95 of larger diameter slidable within piston 89. The annular groove formed between flanges 94 and 95 of spool 93 is of a width equivalent to the height of the chordal slot 88 in cylinder 84. Normally, a compression spring 96 serves to urge spool 93 downwardly to a position of rest, wherein flange 95 engages shoulder 92 of the cylinder 84.

Referring to FIGS. 3 and 4, supporting plate 22 carries a pair of identical perpendicular, rounded end pilot pins 97 having collars 98 integrally formed therewith, the diameter of the collars 98 being only slightly less than the inside diameter of the bore 85 of the corresponding cylinder 84. Similarly, pins 97 have a diameter only slightly less than that of the bore of the spools 93 and are adapted to pass through the bore of the spools upon placement of the meter unit 10 on the supporting plate 22, thereby accurately locating the meter unit on the metering machine base. At the same time, the length of the pins 97 and the height of the collars 98 are dimensionally held within a few thousandths of an inch and are effective to accurately adjust the corresponding pistons 89 and spools 93, relative to each other and to the chordal slots 88 in the cylinders 84. Thus, chordal openings are provided which are in registry with the slots 88 in cylinders 84 to permit freedom of sliding movement of the lock bar 68 therein.

Following the adjustment of the lock bar 68 the extent of its movement to the right (FIG. 2) and the engagement of the ear 71 in the notch 72 of disk 73 (FIG. 3), a retraction of the lock bar 68 is prevented once the meter unit is removed from the supporting plate 22. In the meter locking position of the bar 68, the inclined surfaces 102 and 103 of bar 68 are positioned in a manner such that upon removal of the meter unit from plate 22 and pins 97, the pistons 89 and spools 93 in each cylinder 84 drop into the path of the corresponding inclined surfaces 102 and 103, under the influence of respective springs 91 and 96. It will be noted that a variation of a few thousandths of an inch in the length of either pin 97 or in the height of either collar 98 would prevent proper registry of the piston 89 and spool 93 with the chordal slot 88 to permit passage of the lock bar 68 therethrough. By virtue of this fact, tampering with the meter is made more difficult after removal of the meter from the metering machine.

In order to further ensure that there be no movement of the lock bar 68 after the meter unit is removed, a pair of metallic balls 104 are disposed in angularly-formed troughs 105 (FIG. 5) in meter base 17. The troughs 105 are positioned either side of the axes of shaft 28 at a right-angle thereto and beneath the distended end portion of the lock bar 68. In the upright position of the meter, the balls 104 remain in the low end of the corresponding troughs 105 oppositely disposed permitting freedom of movement of the bar 68. Arranged for cooperation with the balls 104 are a pair of elongated openings 106 formed in the distended end portion of the lock bar 68, with the extruded portion 107 opposed and parallel to the bar. Upon movement of lock bar 68 to the extreme meter locking position, the openings 106 are in registry with the corresponding troughs 105. Thus, it can be seen that should the meter be tilted in one direction or the other relative to the axis of the shaft 28, a ball 104 moves into the corresponding opening 106 to block movement of the bar 68. Similarly, if the meter should be placed on its top, to more easily tamper with the plunger locks 80, both balls 104 will move into the corresponding openings 106 in bar 68.

Referring to FIGS. 4 and 6, there are two normally closed microswitches 108 and 109 provided, secured in stacked relationship on one arm of an offset bracket 110, the other arm of which is secured on the lower surface of supporting plate 22. Switch 108, when closed, completes the electrical circuit to the meter drive mechanism while normally closed switch 109 completes the circuit to the power drive for the envelope feed mechanism of the metering machine.

As stated above, with the manually controlled handle 40 in the extreme right-hand position shown in FIGS. 2 and 4, ear 57 on slide 41 is engaged in notch 56 of detent bar 46 to lock the meter unit 10 in place on supporting plate 22. Under this condition, both switches 108 and 109 are closed and an envelope sealing and postage metering operation is possible. For a "Seal Only" operation, operating handle 40 is first moved radially outwardly and is thereafter angularly rotated to position ear 57 in detent notch 55, as seen in FIG. 6. At this time, the shorter pin 114 of a pair of pins 114 and 115 secured on locking disk 34 operates switch 108 to open the circuit to the postage meter drive mechanism. In addition to the disconnection of the circuit to the meter drive mechanism, lock bar 68 becomes effective also to lock print drum shaft 28 against possible rotation.

In order to remove the meter unit 10 from supporting plate 22 for a prepaid postage adjustment of the descending register by a postal official, operating handle 40 is moved radially outwardly for adjustment to the extreme left-hand position shown in phantom line in FIG. 2. As the locking disk 34 is thereby rotated to the meter removal position, locking bar 68 is moved to its extreme meter locking position, wherein retraction of the bar 68 is prevented by plunger locks 80 when the meter is detached. At the same time, the longer pin 115 becomes effective to operate both switches 108 and 109, disconnecting the electrical circuitry to the meter drive mechanism and the envelope feed mechanism.

When the operating handle 40 is adjusted to the intermediate position for a "Seal Only" operation, a key operated lock, generally indicated at 116 in FIGS. 3, 4 and 6, may be made effective by one in authority to prevent an operator from removing the meter for the purpose of fraudulently tampering with the meter. Also, it prevents adjustment of the operating handle 40 by an operator to the meter operating position, thereby precluding the taking of fraudulent postage impressions.

For this purpose, the key operated lock 116 is supported on a depending bracket 117 welded or otherwise secured on the offset flange 62 of supporting plate 22. The key opening being accessible through machine base cover 24 (FIGS. 1, 3 and 4). At its upper end, bracket 117 carries a laterally extended backing flange 118 adapted to cooperate with a key operated arm 119 of the lock 116. Normally, arm 119 is displaced approximately 90° counter-clockwise from the position shown and as viewed from the bottom in FIG. 4 and the right in FIG. 6. Following the adjustment of the operating handle 40 to the "Seal Only" or intermediate position shown in FIG. 6, the operation of the lock 116 rocks the arm 119 into position between the end of the flange 118 and the offset portion 59 of the slide 41. Thus, the ear 57 on slide 41 is nonremovably retained in notch 55 of detent bar 46.

What is claimed is:

1. In a mailing machine having a base unit and a meter unit, said meter unit being detachably mounted on said base unit and including a cyclically rotatable print drum shaft, and a locking mechanism for securing said meter unit on said base unit comprising, a plate carried by said base unit for supporting said meter unit, a manually operable locking means associated with said supporting plate selectively adjustable from a normally inoperative position to each of a plurality of operative positions for securing said meter unit on said supporting plate, said locking means being effective in the inoperative position to enable detachment of said meter unit from said supporting plate, a first blocking means associated with said meter unit positionable by said manually operable locking means to prevent cyclic rotation of said print drum shaft upon adjustment of said locking means to the inoperative position and to at least one operative position, a second blocking means operable to retain said first blocking means in position to prevent rotation of said print drum shaft subsequent to the adjustment of said manually operable locking means to the inoperative position and the detachment of said meter unit from said supporting plate, and a key operated lock means selectively operable to lock said manually operable locking means in at least one of said plurality of operative positions.

2. A device of the character described in claim 1 further including a plurality of meter locking members carried by said meter unit for mounting said meter unit on said supporting plate, each of said locking members having an annular groove therein.

3. In a device of the character described in claim 2 wherein said supporting plate is provided with a series of apertures for receiving said locking members, the annular groove in each of said members adapted for engagement by said manually operable locking means upon adjustment thereof from the inoperative position.

4. In a device of the character described in claim 3 wherein said manually operable locking means comprises a locking disk supported for rotation on said supporting plate angularly adjustable to each of three positions including a normally inoperative position, a control pin carried by said locking disk engageable with said first blocking means upon mounting said meter unit on said supporting plate, and a manual control means for selectively controlling the angular adjustment of said locking disk from the inoperative position into engagement with the annular groove in said locking members and to control operation of said first blocking means.

5. In a device of the character described in claim 4 wherein said manual control means comprises a control lever supported for radial sliding movement on said locking disk and adjustable subsequent to the outward radial movement thereof to control the angular adjustment of said locking disk and the adjustment of said first blocking means, a projection carried by said lever, a detent means for removably retaining said control lever in each adjusted position other than the normally inoperative position, and a resilient means normally biasing said lever radially inwardly for engagement of said projection with said detent means.

6. In a device of the character described in claim 5 wherein said detent means comprises a bar having a pair of angularly spaced notches engageable by said projection of said lever, each of said notches representative of a locking adjustment of said locking disk.

7. In a device of the character described in claim 5 wherein said resilient means is a spring.

8. In a device of the character described in claim 5 wherein said first blocking means comprises a slide member supported in said meter unit and operatively connected by said control pin with said locking disk for movement into blocking relationship with said print drum shaft to prevent rotation thereof upon angular adjustment of said locking disk by said control lever to the inoperative position and to a selected one of the other of said three positions, said slide member being retained by said second blocking means in blocking relationship with said print drum shaft upon adjustment of said control lever to the inoperative position and removal of said meter unit from said supporting plate.

9. In a mailing machine having a base unit and a meter including a print drum shaft supported for cyclic rotation in said meter, said meter being detachably mounted on said base unit, and a locking mechanism for securing said meter on said base unit comprising:

a plate carried by said base unit for supporting said meter, said plate having a plurality of apertures therein, pilot pins projecting upwardly from said plate, a series of pads on said meter extending downwardly through said apertures when said meter is mounted on said supporting plate, an annular groove in each of said pads, a locking disk supported for angular rotation on said supporting plate and having a normally inoperative position to enable removal and replacement of said meter, said locking disk being adapted to engage in said annular groove in each of said pads to lock said meter in place upon mounting said meter on said supporting plate and the angular adjustment of said locking disk from the inoperative position, a manual control lever movable radially of said locking disk and angularly positionable selectively to each of three positions including an inoperative position to control the angular adjustment of said locking disk, a detent bar including a pair of angularly spaced notches therein corresponding to each angularly adjusted position of said locking disk other than the inoperative position, a projection formed on said control lever adapted for engagement in either of said notches in said detent bar, a spring means means normally biasing said control lever radially inwardly to resilient retain said projection in each of said notches in the corresponding angular position of said control lever, a full-cycle disk on said print drum shaft having a recess therein, a latch slide in said meter including a locking projection adjustable relative to said full-cycle disk, a camming pin carried by said locking disk connectible with said latch slide when said meter is mounted on said supporting plate operable to adjust said latch slide to engage the locking projection in the recess in said full-cycle disk upon operation of said manual control lever and the angular rotation of said locking disk to the inoperative and intermediate positions thereof, and an auxiliary lock means associated with said latch slide normally disabled by said pilot pins when said meter is mounted on said supporting plate and operable to prevent movement of said latch slide and disengagement of said projection from said recess upon angular adjustment of said control lever to the inoperative position and removal of said meter from said supporting plate.

10. A device of the character described in claim 9 further including a key operated interponent selectively rockable from an inoperative to an operative position to prevent angular adjustment of said control lever from the intermediate position.

11. A device of the character described in claim 9 further including a pair of normally closed switches, one of said switches controlling operation of said meter unit, and switch operating means carried by said locking disk effective to open each of said switches upon adjustment of said manual control lever to the inoperative position and to effect opening of said one of said switches in the intermediate adjusted position of said lever.

References Cited

UNITED STATES PATENTS

| 1,657,279 | 1/1928 | Pitney | 235—101 |
| 2,052,485 | 8/1936 | Ogden | 235—101 |
| 2,356,699 | 8/1944 | Rouan et al. | 235—101 X |
| 2,522,237 | 9/1950 | Ryan eta al. | 235—101 X |
| 3,133,700 | 5/1964 | Schaerer et al. | 235—101 |

RICHARD B. WILKINSON, Primary Examiner

STANLEY A. WAL, Assistant Examiner